(12) United States Patent
Puri et al.

(10) Patent No.: US 10,326,838 B2
(45) Date of Patent: Jun. 18, 2019

(54) LIVE MIGRATION OF PROBE ENABLED LOAD BALANCED ENDPOINTS IN A SOFTWARE DEFINED NETWORK

(71) Applicant: Microsoft Technology Licensing, LLC, Redmond, WA (US)

(72) Inventors: Ranjit Puri, Bothell, WA (US); Manish Tiwari, Uttarakhand (IN); Madhan Sivakumar, Seattle, WA (US); Vikas Bhardwaj, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 15/449,542

(22) Filed: Mar. 3, 2017

(65) Prior Publication Data

US 2018/0091591 A1    Mar. 29, 2018

Related U.S. Application Data

(60) Provisional application No. 62/399,286, filed on Sep. 23, 2016.

(51) Int. Cl.
*H04L 29/08* (2006.01)
*H04L 12/26* (2006.01)

(52) U.S. Cl.
CPC .......... *H04L 67/1095* (2013.01); *H04L 43/10* (2013.01); *H04L 67/1027* (2013.01); *H04L 67/1031* (2013.01); *H04L 67/1097* (2013.01)

(58) Field of Classification Search
USPC ....................................................... 709/223
See application file for complete search history.

(56) References Cited

U.S. PATENT DOCUMENTS 8,423,646 B2    4/2013 Jamjoom et al.
8,949,431 B2 *  2/2015 Bercovici ........... G06F 9/45533
                                                        709/226

(Continued)

FOREIGN PATENT DOCUMENTS

WO    2013113264 A1    8/2013

OTHER PUBLICATIONS

Kalim, et al., "Seamless Migration of Virtual Machines Across Networks", In Proceedings of International Conference on Computer Communications and Networks, Jul. 30, 2013, 7 Pages.

(Continued)

*Primary Examiner* — Jude Jean Gilles
(74) *Attorney, Agent, or Firm* — Baker & Hostetler LLP

(57) ABSTRACT

Methods, systems, and devices are described herein for modifying the monitoring of the health of a data center IP endpoint (such as VM) during live migration of the data center IP endpoint from a source host to a destination host. In one example, the described techniques may include receiving an indication that a virtual machine is going to be live migrated from a source host to a destination host. Next, evaluation of health probe responses originating from the virtual machine may be suspended for a time period. The time period may be selected based on the live migration. The evaluation of the probe responses originating from the virtual machine may be resumed upon completion of the time period. In some cases, a health probe status of the virtual machine may be migrated from the source host to the destination host.

20 Claims, 10 Drawing Sheets

(56) References Cited

U.S. PATENT DOCUMENTS

| | | | |
|---|---|---|---|
| 9,054,917 B2* | 6/2015 | Khesin | H04L 67/34 |
| 9,201,704 B2 | 12/2015 | Chang et al. | |
| 9,372,726 B2 | 6/2016 | Gopalan | |
| 9,378,068 B2 | 6/2016 | Anantharam et al. | |
| 9,594,598 B1* | 3/2017 | Brouwer | G06F 9/5077 |
| 9,836,327 B1* | 12/2017 | Brouwer | G06F 9/5077 |
| 10,044,678 B2* | 8/2018 | Van der Merwe | H04W 8/12 |
| 2007/0180436 A1* | 8/2007 | Travostino | G06F 9/4856 |
| | | | 717/138 |
| 2008/0016206 A1* | 1/2008 | Ma | H04L 43/0817 |
| | | | 709/224 |
| 2008/0201414 A1 | 8/2008 | Husain et al. | |
| 2011/0246669 A1* | 10/2011 | Kanada | G06F 9/4856 |
| | | | 709/238 |
| 2012/0054367 A1 | 3/2012 | Ramakrishnan et al. | |
| 2012/0084445 A1* | 4/2012 | Brock | G06F 9/5077 |
| | | | 709/226 |
| 2013/0159487 A1* | 6/2013 | Patel | H04L 67/1031 |
| | | | 709/223 |
| 2014/0244814 A1* | 8/2014 | Kuzmack | H04L 29/06006 |
| | | | 709/223 |
| 2015/0309818 A1 | 10/2015 | Lee et al. | |
| 2015/0347166 A1* | 12/2015 | Noel | G06F 11/3495 |
| | | | 718/1 |
| 2016/0188378 A1 | 6/2016 | Chao et al. | |
| 2018/0139101 A1* | 5/2018 | Puri | H04L 41/12 |

OTHER PUBLICATIONS

Patel, et al., Ananta: Cloud Scale Load Balancing in Proceedings of ACM SIGCOMM Computer Communication Review, vol. 43, Issue 4, Aug. 27, 2013, pp. 207-218.

* cited by examiner

LIVE MIGRATION OF PROBE ENABLED LOAD BALANCED ENDPOINTS IN A SOFTWARE DEFINED NETWORK

CROSS REFERENCE TO RELATED APPLICATIONS

The present invention claims benefit under 35 U.S.C. § 119(e) of U.S. provisional application No. 62/399,286, filed Sep. 23, 2016, the contents of which are hereby incorporated by reference into this disclosure in their entirety.

BACKGROUND

Virtualization of networks is common in modern datacenters for various applications. Virtualization allows datacenter tenants to create a network with an addressing scheme that is suitable for various workloads and also allows the tenant administrator to set networking policies within their network as they see fit.

These virtualized tenant networks are an overlay atop of the underlying physical network of the datacenter. The networking interfaces in a tenant virtual machine (VM) are therefore connected directly to the virtualized tenant network (or the overlay network). Switches, which are aware of both Virtualized networks and the physical networks, perform appropriate transformations to ensure that packets are delivered to and from the virtualized network endpoints in a way that both the overlay endpoints and the underlay endpoints are unaware of the specifics of the network virtualization intended by the tenant administrators.

Programming of virtualization aware switches is typically done by a software defined network (SDN) controller. An SDN controller may maintain a repository of the intended networking state in the datacenter and also incorporate logic to achieve that state, e.g. by programming switches.

Load balancing is a typical function desired in modern datacenters. Load balancers map virtualized IPs (VIP) to a set of Data Center IPs (DIPs). DIP endpoints may represent endpoints inside the virtualized network of a tenant. VIPs are typically internet or at least datacenter routable, i.e., they are not typically virtualized. DIPs on the other hand are typically virtualized. In order to perform the translation between non virtualized (VIP) endpoints and virtualized (DIP) endpoints, load balancers running under an SDN controller must be aware of the network virtualization policies that the SDN controller intends to achieve in the datacenter. Load balancers must also work in concert with other components in the SDN controller to achieve load balancing of workloads virtualized in the tenant space.

In a typical datacenter, hosts sometimes need to be taken out of service for example, for servicing, maintenance, upgrades to server software, etc. In such cases, tenant workloads are typically live migrated to another host so that the workloads experience minimal or no down time. In the live migration scenario, CPU context for all processes running within the migrated workload is ensured to be restored on the destination host. In a similar way, it is also beneficial to ensure that the network flows terminating at the migrating workload are restored at the destination host. This is also true for flows originating outside the datacenter such as those coming over a load balancer.

In other cases, DIP endpoints may not be virtualized, such as if they are associated with VMs that contribute to a datacenter's infrastructure. These DIPS may also be behind or work in conjunction with a load balancer and/or be live migrated. As used herein, a DIP endpoint may be virtualized or non-virtualized.

Probes are typically employed by load balancers to ascertain health of DIP endpoints behind a load balancer VIP. The list of DIP endpoints serving a VIP may be updated based on the probe status reported from each of the possible DIP endpoints. However, the effects of live migration on probing, which may negatively affect the probing process, have not been addressed.

SUMMARY

Illustrative examples of the disclosure include, without limitation, methods, systems, and various devices. In one aspect methods, systems, and devices are described herein for modifying the monitoring of the health of a DIP end point such as a virtual machine (VM) during live migration of the VM from a source host to a destination host. In one example, the described techniques may include receiving an indication that a virtual machine is going to be live migrated from a source host to a destination host. Next, evaluation of health probe responses originating from the virtual machine may be suspended for a time period. The time period may be selected based on the time period of live migration. The evaluation of the probe responses originating from the virtual machine may be resumed upon completion of the time period. In some cases, a health probe status of the virtual machine may be migrated from the source probing entity to the destination probing entity.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
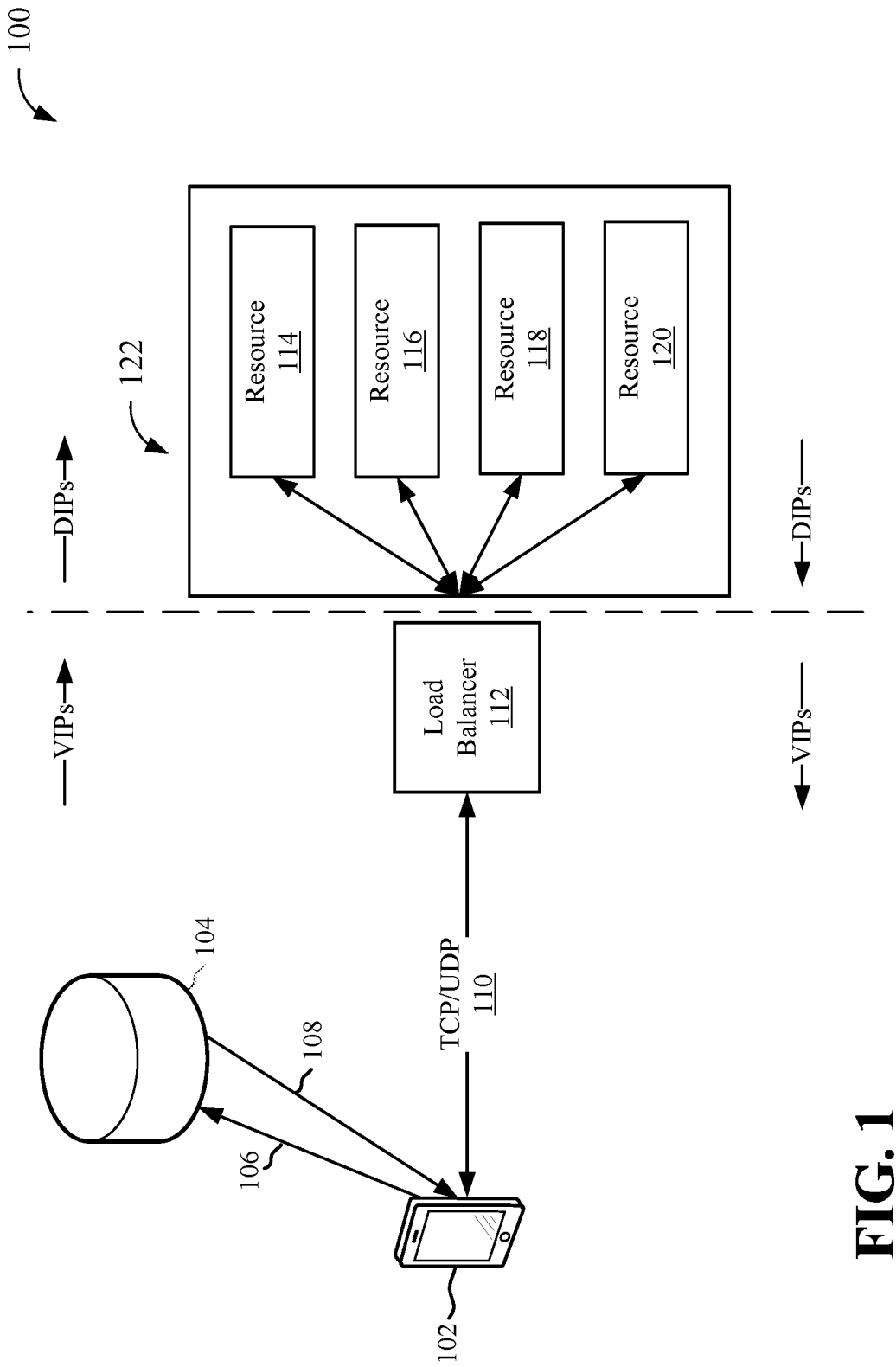
FIG. 1 depicts an example diagram of a client device in communication with one or more virtual resources via a load balancer.

Systems and techniques are described herein for monitoring the health or probe status of a DIP end point. In one example, the DIP end point is a virtual machine (VM) when the VM is migrated, for example, from a source host to a destination host. In other examples, the end point is a container-based virtualization. As used herein a container is an operating system level virtualization. The container allows applications to be executed without the need to start up and execute an entire VM. Unlike a VM, multiple containers can share a single operating system instance. Although multiple containers can share a single operating system, each container may have its own DIP. Containers themselves may run on top of a VM instance. As used herein, an embodiment is discussed in the context of a VM for the sake of convenience; however, the techniques describe apply similarly to containers and other DIP endpoints.

In some cases, multiple virtual machines may be provided by one or more host devices (e.g. physical computing devices) managed by one or more datacenters. Each datacenter may implement various components to effectuate providing virtual machines to end users, customers, etc. In some implementations, a datacenter may employ a load balancer, which may be a hardware component, software, or a combination thereof, to manage workloads for customers or end user by mapping the workloads to one or more virtual machines. Periodically, or upon the occurrence of some trigger event, the load balancer, or datacenter or a VM manager more generally, may monitor the health of each VM. This may be accomplished through probing each VM. Each VM may respond to the probe and indicate whether the VM is healthy (e.g., it can continue to process data), or unhealthy (e.g., it cannot continue processing data/workloads and needs to be taken offline and is not included in a list of available VMs). In some aspects, VMs may need to be live migrated between different hosting devices, for example, when a hosting device needs to be serviced, updated, etc.

In these cases, it may be beneficial to also migrate the probe status of the VM or VMs on the source hosting device to the destination hosting device. This migration, from the perspective of clients using reliable transport protocols, reduces or eliminates the perception of downtime at the application level. When an application makes a connection and sends a new packet to the VIP, the load balancer mux, receives the packet. The load balancer then picks a DIP endpoint. If the DIP endpoint is live migrating, no response can be received by the client. However, the probe status migrates with the DIP endpoint from source probing entity to destination probing entity. Because the DIP endpoint is still in the DIP set of the VIP, the DIP would have been reported as healthy by the source probing entity prior to live migration. The DIP endpoint therefore does not need to be removed from the DIP set available to the load balancer based on the techniques described herein. Until the DIP finishes live migrating, the TCP (or other reliable protocol) stack on the client would not have received a response to the message it sent to the VIP. Therefore stack retransmits the message to the VIP, since retransmission is a feature of most reliable protocols. The loadbalancer mux again picks the same DIP endpoint. This DIP endpoint has now completed migrating and can thus respond to traffic. From the perspective of the application there is no perceived down-time, a few reliable protocol retransmissions were required, but no tear down of session/re-connect and re-transmit of all message segments was required.

, This endpoint migration may include sending or updating the health status of a VM when it is operating on source host before it is live migrated to a destination host or a destination VM probing entity (which is necessarily associated with the destination host, such as one or more components of a hardware or software load balancer, software load balancer manager, agent, etc.). In different scenarios, different entities may be responsible for probing VMs. These entities may include an agent of a load balancer operating on a specific host device, a more centralized load balancer or load balancer component, or other entity. In these cases, the probe status of the VM associated with the source host (VM instance prior to live migration) may be migrated to the VM associated with the destination host (VM instance after live migration) via setting the destination VM probe status as the source VM probe status. In this way, the VM may be assumed to be healthy when it is live migrated to the destination host. In some aspects, an amount of time may be configured to pause or suspend evaluation of the probe status from the VM during the live migration, to prevent any inaccurate report that the VM is down during the live migration process. In some cases, sending of probes to the migrating VM may additionally or alternatively be suspended during the live migration process/the configured time period.

In one aspect, an indication that a virtual machine is going to be migrated (e.g., live migrated) from a source host to a destination host may be received, for example, by an entity associated with multiple virtual machines. In some cases, the load balancer may receive the indication of live migration. Upon receiving the indication of live migration, the evaluation of probe responses from the virtual machine to be live migrated may be suspended for a configurable time period. The time period may be configured, either automatically or manually, based on the live migration process, such that the time period may be slightly longer than the time needed to complete or substantially complete the live migration. The probe status of the virtual machine may be migrated from the source probing entity to the destination probing entity. Evaluation of the probe responses originating from the VM may be resumed upon completion of the live migration or upon expiration of the time period. In some cases, the probe status that is migrated may be based on probe responses received (which may factor in the tenant administrator configured hysteresis) prior to the beginning of live migration. In one example, only probe statuses that indicate the VM is healthy may be migrated to the VM at the destination host or otherwise associated with the VM at the destination host, as managed by a VM probing entity. Only healthy probe statuses may be migrated due to the fact that if a VM is unhealthy, down time is already expected to fix or repair the VM prior to work being performed by the VM (in most instances).

In some cases, the status of the VM, for example, that is discoverable by entities outside the datacenter, may be maintained as healthy/available during the live migration process. This may help to further ensure that no additional delays are added to the live migration process prior to the VM resuming normal workloads (e.g., delays due to the VM (DIP endpoint) being dropped out of an availability list). The availability list includes DIP endpoints which can be load balanced to if traffic is incident on the loadbalancer (mux) for a given VIP. In some aspects, the time period for suspending evaluation of probe responses from the VM may be configured based on a TCP timeout or blackout window, or other channel layer over which the VM communities with the VM manager or load balancer, for the live migration.

The architecture and functionality of various components in a datacenter will now be described in reference to FIGS. 1 through 6, as context for techniques for monitoring health of VMs during live migration. FIG. 1 illustrates an example system 100 that includes a client device 102 in communication with a datacenter or other virtual platform 122. In one example, client 102, which may be representative of any type of request for virtualized services provided by datacenter 122, may have some work to be performed by datacenter 122. In one example, client device 102 may communicate with a domain name system (DNS) 104 to obtain one or more virtualized IP addresses (VIPS) of a service or other process running in the datacenter 122. Client device 102 may send a lookup request for a particular service, application, or data managed by datacenter 122 at operation 106. The DNS 104 may look up the service or data associated with the request and return at least one VIP associated with the requested data, service, etc. The client device may then communicate with the datacenter 122, at operation 110. In some aspects, this may be over a TCP, UDP, or other communication protocol, as is known in the art.

The datacenter may implement a load balancer 112, which may distribute incoming traffic among resources or VMs, or VM instances 114-120. As used herein, a VM instance may be an instantiation of a VM executing on a host device. Multiple instances of the same VM (e.g., same configuration, data, logic, etc.), may be executed concurrently on the same or different device or host. In some aspects, the load balancer 112 may include a hardware component. In other cases the load balancer 112 may be implemented in software, e.g., as a software load balancer (SLB). As described in the rest of the disclosure, only an SLB will be described in detail. However, it should be appreciated that the techniques described herein may also be easily implemented in hardware load balancers as well. The load balancer 112 may convert data (e.g., packets) addressed to a VIP to a datacenter internet protocol address (DIP), for routing to one or more resources 114-120. The load balancer 112 may also provide outbound internet connectivity via translating packets destined for external locations, such as client device 102.

Figure 2:
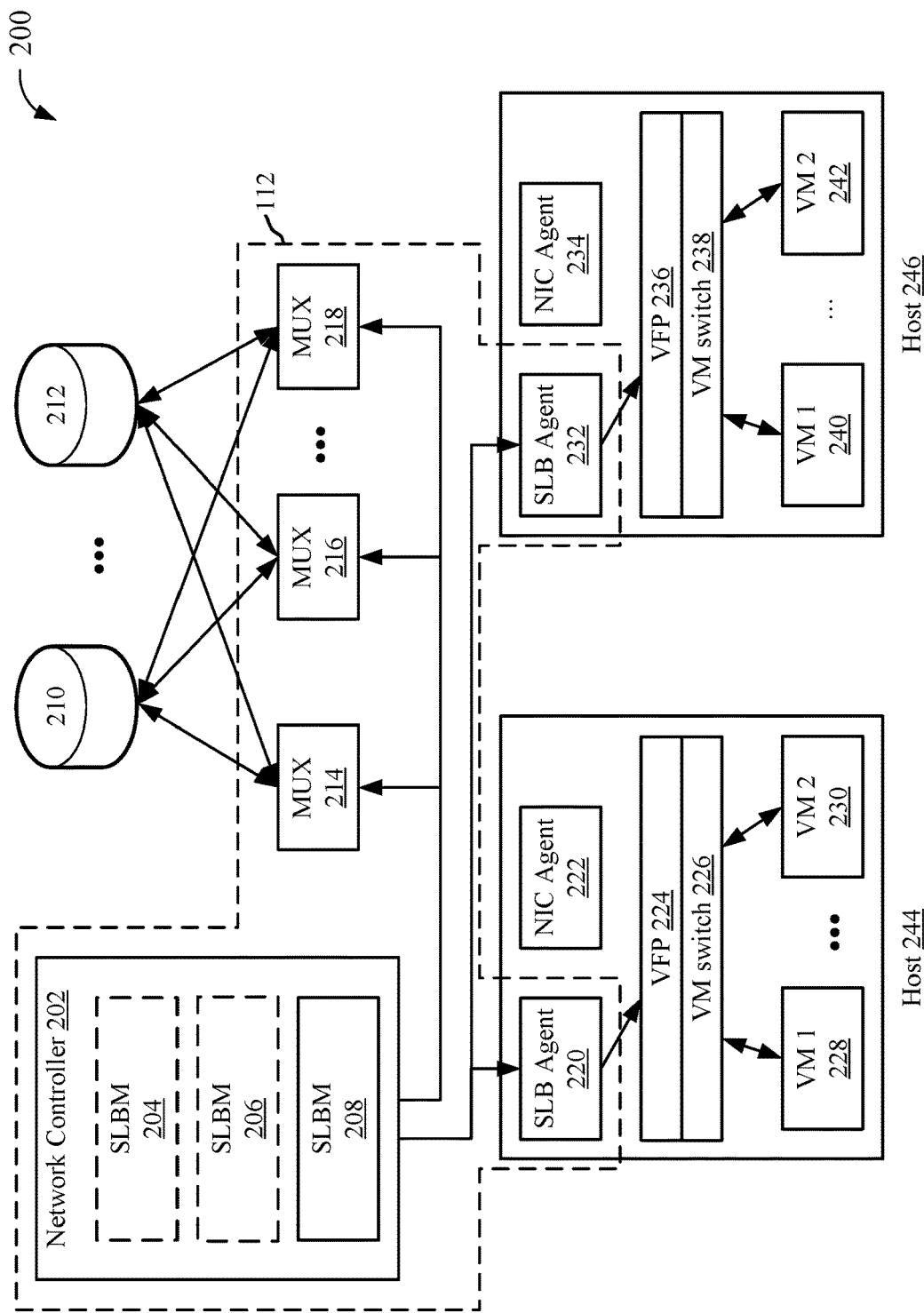
FIG. 2 depicts an example architecture of a software load balancer in communication with multiple virtual machines.

FIG. 2 illustrates an example data center 200, which may implement one or more software load balancers 112. Software load balancer (SLB) 112, as illustrated, is a distributed system that comprises multiple data center components that work in concert to perform load balancing and network address translation (NAT) functions.

In some aspects, load balancer 112 may include a network controller 202, which may control routing, addressing, and other aspects of datacenter 200/VMs. The network controller 202 may include one or more instances of a software load balancer manager (SLBM) 204, 206, 208. Each SLBM 204, 206, 208 may process SLB commands coming in through one or more APIs and be responsible for programming goal states. Each SLBM 204, 206, 208 may synchronize state between the different components in SLB 112. In some aspects, each SLBM 204, 206, 208 may be responsible for a certain number of VMs 228, 230, 240, 242, and/or a number of host devices 244, 246, and so on.

The network controller 202/SLBM instances 204, 206, 208 may communicate with one or more multiplexer (MUXes) 214, 216, 218. Each of MUXes 214, 218, 218 may receive traffic that is routed via routers 210, 212 using ToR or other anonymity network technique, for example that may receive traffic from one or more networks, such as the internet. In some aspects, the one or more routers 210, 212 may route inbound traffic to one or more MUXes 214, 216, 218 using equal-cost multi-path routing (ECMP). In some aspects, the one or more routers 210, 212 may communicate with MUXes 214, 216, 218 using Border Gateway Protocol (BGP). Each SLBM 204, 206, 208, may determine policies for distribution of traffic/requests to MUXes 214, 216, 218. Each SLBM 204, 206, 208, may also determine policies for routing data from MUXes 212, 214, 216 to one or more hosts 244, 246 (e.g., hyper-V enabled hosts). Each SLBM 204, 206, 208, may also manage VIP pools that map VIPs to DIPs of different VMs 228, 230, 240, 242, Each MUX 212, 214, 216 may be responsible for handling data. Each MUX 212, 214, 216 may advertise to router 210, 212 its own IP as the next hop for all the VIPs it is associated with. MUXes 212, 214, 216 may receive the traffic from the routers 210, 212 and may performed load balancing to map the traffic to available VMs 228, 230, 240, 242.

Each host device 244, 246, which may include various types and configurations of computing devices such as servers and the like, may execute or otherwise be associated with an SLB agent 220, 232. Each SLB host agent 220, 232 may be responsible for programming rules on the hosts 244, 246. Each SLB host agent 220, 232 may also be the requesting port from SLBM 204, 206, 208 for outbound connections. Each SLB host agent 220, 232 may send health probes to VMs 228, 230, 240, 242 (e.g., addressed to a DIP associated with each VM, where the DIP is in the tenant's virtual network space) and receive responses from the VM concerning their health, status, etc., via one or more VM switches 226, 238. Each VM switch 226, 238 may be associated with a virtual machine filtering platform (VFP) to facilitate multitenant VM implementations. In some aspects, an network controller (NC) agent 222, 234, on each host 244, 246, may facilitate creation a virtualized NIC from which the SLB host agent 220, 232 may send probe requests.

In some aspects, each host device 244, 246 may be associated with a hypervisor. In some aspects, SLB host agents 220 and 232 may execute via the hypervisor or Hyper-V host. Each SLB host agent 220, 232 may listen for SLB policy updates from controller 202/SLBM 204, 206, 208 and programs rules to a corresponding VM switch 226, 238. VM switches 226, 238 may be designed to facilitate operations in a SDN, and process the data path for SLB—de-encapsulation and NAT. Switches 228, 242 may receive inbound traffic through MUXes 214, 216, 218, and route outbound traffic either back through MUXes 214, 216, 218 or directly to outside IPs, bypassing the MUXes 214 216, 218.

In some cases, DIP endpoints may not be virtualized, such as if they are associated with VMs that contribute to a datacenter's infrastructure. These DIPS may also be behind or work in conjunction with a load balancer and/or be live migrated. As used herein, a DIP endpoint may be virtualized or non-virtualized, and the described techniques may operate on both types of DIPs.

Inbound data flows will be described in reference to FIGS. 3 and 4, and outbound flows will be described in reference to FIG. 5, below.

Figure 3:
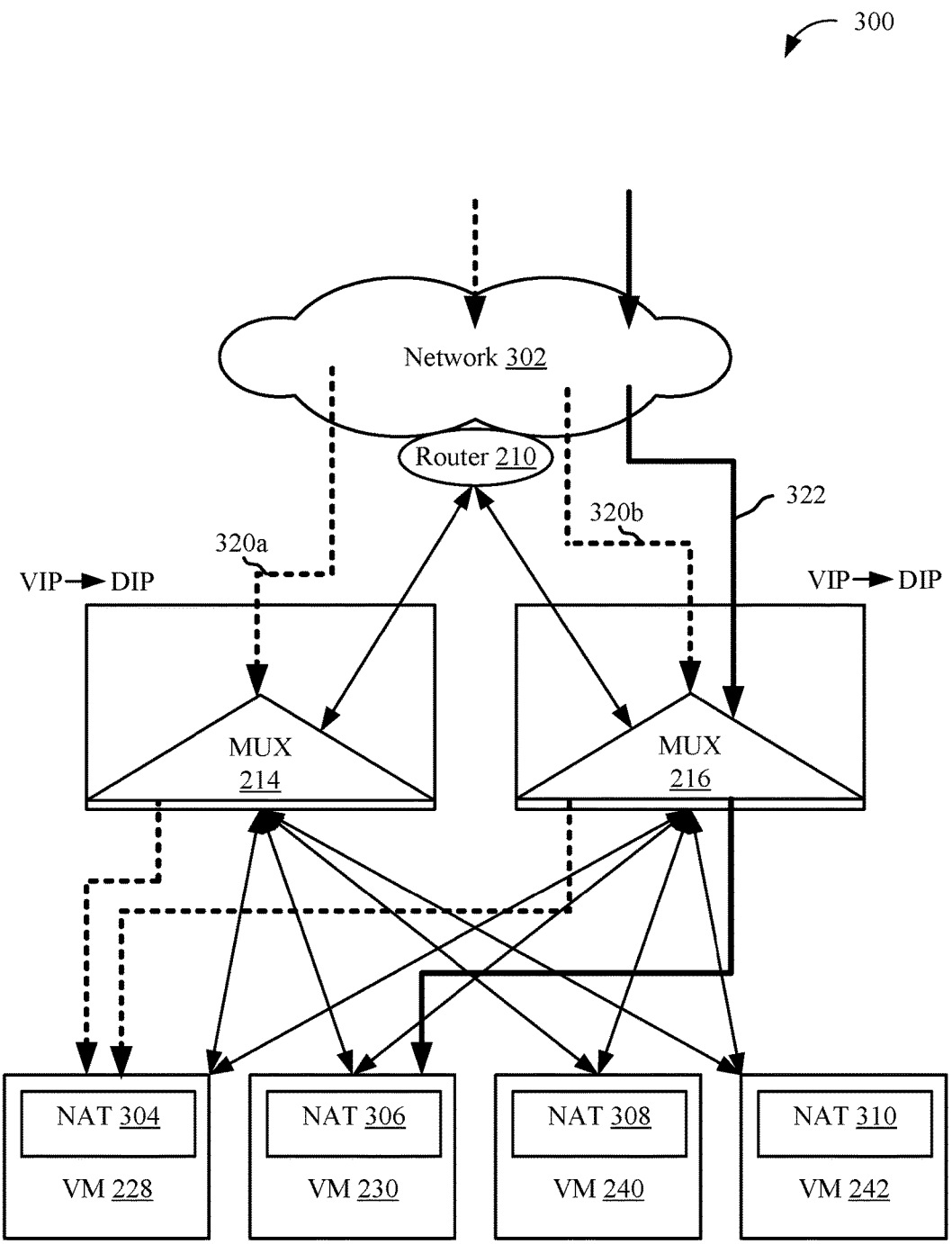
FIG. 3 depicts an example of inbound traffic to one or more virtual machines via a load balancer.

FIG. 3 depicts an example process flow 300 of inbound traffic to one or more virtual machines via a load balancer. A first connection or flow may be depicted as dotted line 320. In the example system illustrated, flow 320 may take two paths to arrive at VM 228, either through MUX 214 or through MUX 216, as represented by flows 320*a* and 320*b*. A second flow 322 may be directed at VM 230, and may be routed through MUX 216.

As illustrated, the top layer or first tier may include a network 302, such as the internet, and router 210, which may be responsible for distributing packets via ECMP to MUXes 214, 216, for example, on layer 3 of the data plane. The MUXes 214 and 216 may be on the second tier, and may provide encapsulation via translating VIPs to DIPS, to route data to one or more VMs 228, 230, 240, 242, on layer 4 of the data plane. As ECMP hashing may not be inherently stable, MUXes 214 and 216 may maintain a consistent hash to ensure packets from same flow get routed to the same server or VM. MUXes 214 and 216 may encapsulate packets via Virtual Extensible LAN (VXLAN) or Network Virtualization using Generic Routing Encapsulation (NVGRE) to a VM, such a associated with a DIP.

The VMs 228, 230, 240, 242 may be on the third tier, and may each employ NAT functionality 304-310, which may de-capsulate the packets received from MUXes 214, 215 and deliver them to the corresponding VM.

Figure 4:
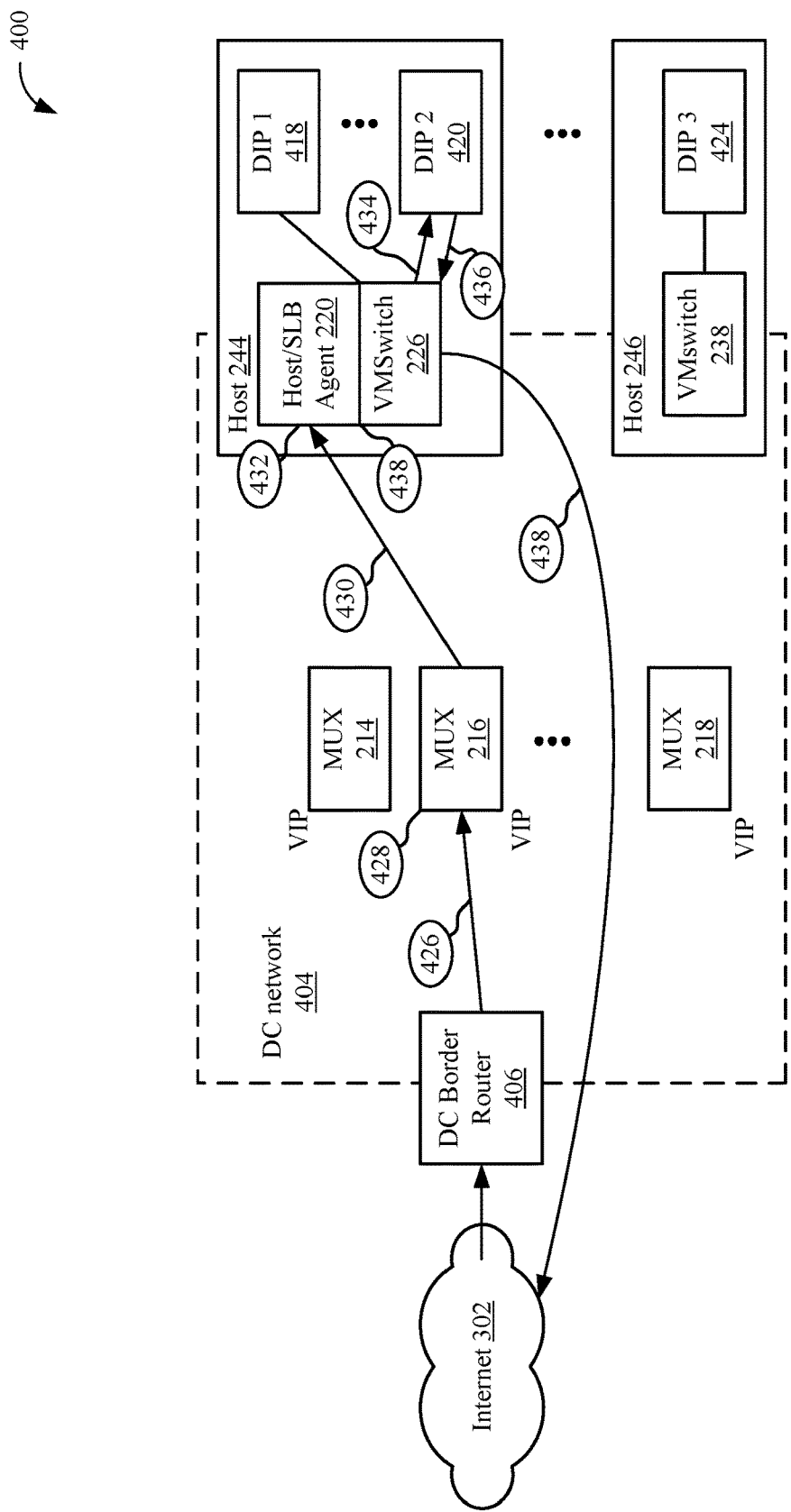
FIG. 4 depicts another example of inbound traffic to one or more virtual machines via a load balancer.

FIG. 4 depicts another inbound flow of data 400 to a datacenter/VMs managed by a load balancer, such as the software load balancer described above in reference to FIG. 2. Packets destined for a VIP may be load balanced and delivered to the DIP of a VM. When a VIP is configured, each MUX 214, 216 may advertise a route to its first-hop router, e.g., a datacenter (DC) border router 406, announcing itself as the next hop for that VIP. This causes the router(s) 406 to distribute packets, received via a network or the internet 302, destined for the VIP across all the MUX nodes 214, 216 based on ECMP, as depicted by operation 426. Upon receiving a packet, the MUX 216 may select a DIP for the connection based on one or more load balancing algorithms. The MUX 216 may then encapsulate the received packet setting the selected DIP as the destination address in the outer header of the packet, at operation 428. In some cases, the MUX 216 may encapsulate the packet using IP-in-IP protocol, VXLAN, NVGRE, or other similar protocol. The MUX 216 may then send the encapsulated packet using regular IP routing at the MUX 216, at operation 430. In some cases, the MUX 216 and the DIP, here DIP2 420, do not need to be on the same VLAN, they may just have IP (layer-3) connectivity between them. The host agent or SLB agent 220, located on the same physical machine 224 as the target DIP, DIP2 420, may intercept this encapsulated packet, remove the outer header, and rewrite the destination address and port, at operation 432. In some aspects, the VFP 224, 236, which may be programmed by the SLB agent 220, 232, may intercept encapsulated packets. The SLB Agent 220 may record this NAT state. The SLB agent 220 may then send the re-written packet, via VM switch 226, to the VM associated with DIP 2 420. The SLB host agent 220 may then send the rewritten packet to the VM, at operation 434.

When the VM sends a reply packet for this connection, at operation 436, it is intercepted by the SLB agent 220. The VFP 224, 236 (programed by the SLB Agent 220) may perform reverse NAT based on the state recorded at operation 432, and rewrite the source address and port, at operation 438. The SLB agent 220 may then send the packet out to the router 406 towards the source of the connection, at operation 438. The return packet may bypass the MUX 216, thereby saving packet processing resources and network delay. This technique of bypassing the load balancer on the return path may be referred to as Direct Server Return (DSR). In some cases, not all packets of a single connection would end up at the same MUX 216; however, all packets for a single connection must be delivered to the same DIP.

Table 1 below shows an example of addressing of a packet through the flow described above. As described herein, IPs are presented for simplicity, but layer 4 translations, e.g. mapping VIP: PortA to DIP: PortB, can happen as part of load balancing and NAT.

TABLE 1

| Operation | Outer IP Address: Source | Outer IP Address: Destination | Original IP Address: Source | Original IP Address: Destination |
|---|---|---|---|---|
| 426 | | | Client DIP | VIP |
| 430 | MUX IP | Host physical address | Client DIP | VIP |
| 434 | | | Client DIP | DIP2 |
| 436 | | | DIP2 | Client DIP |
| 438 | | | VIP | Client DIP |

Figure 5:
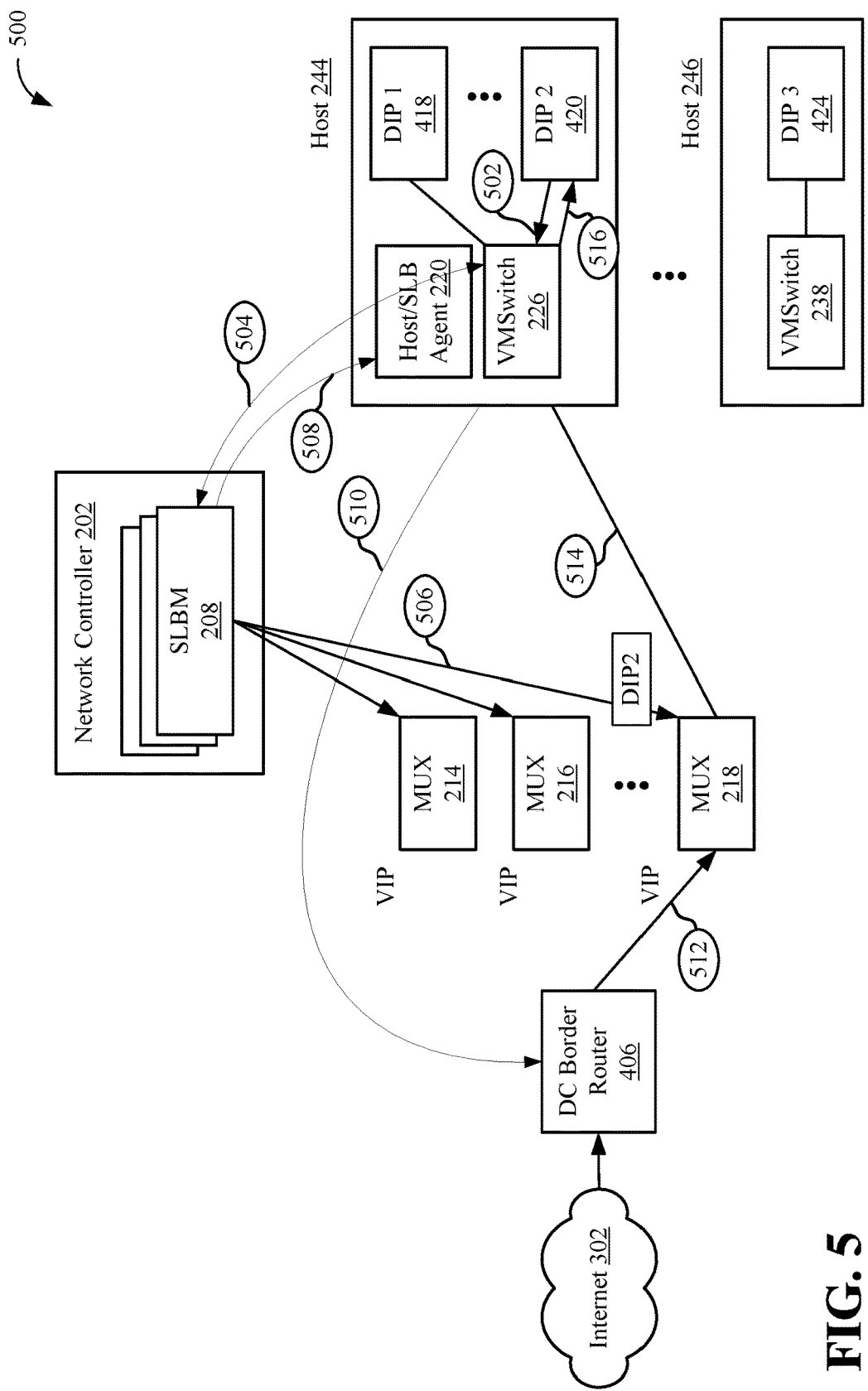
FIG. 5 depicts an example of inbound and outbound traffic to one or more virtual machines.

FIG. 5 depicts an example process flow 500 of outbound and inbound traffic to one or more virtual machines via a load balancer. From a high level, outbound traffic flow may be described in a few steps or operations. First, a host plugin or SLB agent 220 may first request a SNAT port from the SLBM 208. The SLBM 208 may configure a SNAT port on the MUXes 214, 216, 218 and provide the port configurator to the SLB agent 220. The SLB agent 220 may then program a NAT rule into a virtual switch/VFP to do the routing/network address translation. The outbound process flow will now be described in more detail with more specific reference to FIG. 5.

In some aspects, the SLBM 208 may enable distributed NAT for outbound connections, such that even for outbound connections that need source NAT (SNAT), outgoing packets may not need to be routed through a MUX 214, 216, 218. Process 500 illustrates an example of how packets for an outbound SNAT connection are handled. A VM associated with a DIP, such as DIP2 420, may first send a packet containing its DIP as the source address, a destination port, and an external address as the destination address, at operation 502. The VFP 224, 236 may intercept the packet and recognize that the packet needs SNAT. The host/SLB agent 220 may hold the packet in a queue and send a message to SLBM 208 requesting an externally routable VIP and a port for the connection, at operation 504. SLBM 208 may allocate a VIP and a port, from a pool of available ports and configure each MUX 214, 216, 218 with this allocation, at operation 506. The SLBM 208 may then send this allocation to the SLB agent 220, at operation 508. The SLBM 208 may use this allocation to rewrite the packet so that its source address and port now contain a VIP and the designated ports and one of the SLBM designated ports. The SLBM 208 may send the rewritten packet directly to the router 406, at operation 510. The return packets from the external destination are handled similar to inbound connections. The return packet is sent by the router 406 to one of the MUXes 214, 216, 218, at operation 512. The MUX 218 already knows that DIP2 should receive this packet (based on the mapping in operation 506), so it encapsulates the packet with DIP2 as the destination and sends the packet to host 244, at operation 514. The SLB agent 220 intercepts the return packet, performs a reverse translation so that the packet's destination address and port are now DIP2 and a destination port. The SLB host agent 220 may then send the packet to the VM associated with DIP2 420, at operation 516. Table 2 below shows an example of addressing of a packet through the flow described above.

TABLE 2

| Operation | Outer IP Address: Source | Outer IP Address: Destination | Original IP Address: Source | Original IP Address: Destination | Source port (TCP/UDP) | Destination port (TCP/UDP) |
|---|---|---|---|---|---|---|
| 502 | | | DIP2 | Client DIP | Dynamic port | Client port |
| 504 | | SLBM to lease VIP port | | | VIP port | |
| 510 | | | VIP | Client DIP | VIP port | Client port |
| 512 | | | Client DIP | VIP | Client port | VIP port |
| 514 | Mux Self IP | Host physical address | Client DIP | VIP | Client port | VIP port |
| 516 | | | Client DIP | DIP2 | Client port | Dynamic port |

In some aspects, internet VIPs may be shared for outbound traffic amongst VMs in the cloud service/datacenter. One or more ports may be pre-allocated per DIP to ensure a min guaranteed outbound connections, whereas the rest of the ports may be allocated dynamically. In some cases, port allocation may be optimized to maximize concurrent connections to different destinations.

In the context of cloud services and datacenters, load balancers may make use of probes to monitor the health of VMs provided by the cloud service/datacenter. As described above in reference to system 200 of FIG. 2, each VM may be associated with a DIP that enables routing of packets internally in the datacenter/cloud service platform. The load balancer described above is a software or SDN load balancer. However, hardware load balancers too allow for configuration of probes. In example system 200, probes are run from a SLB component on the host (SLB host agent) into DIP VMs. The responders for these probes (which can either be TCP or HTTP server endpoints or other protocol endpoints) run inside DIP VMs. For DIP VMs which are virtualized this implies that the packets corresponding to the probe request are injected into the tenant's virtual network by the load balancer. To the tenant VM, these packets appear to come from a tenant VM default gateway. In some aspects of system 200, a special network interface controller (NIC) or NIC agent 222, 234, or similar component, may create a virtual NIC per tenant subnet on every host that serves as the default gateway. This is also the NIC from which the SLB host agent sends probe requests.

If a workload DIP VM is healthy, the tenant's application(s) inside the VM will respond to the probe request with a success message. If the SLB host agent determines that the current success message represents a state change, the SLB host agent may notify the SLB manager, which in turn adds the now healthy DIP into the DIP set of it's VIPs at the load balancer MUX Pool. A similar chain of notifications may also occur for a state change due to a probe failure. In this case, the now unhealthy DIP is de-configured from the DIP set of its VIP at the load balancer Mux Pool.

A state change occurs after the SLB host agent examines the history of probe results, the host agent may look at a user or tenant administrator configured hysteresis (number of consecutively successful probes before considering DIP to be up and number of consecutive failure probes before considering a DIP to be down) in order to determine if a state change has occurred. The frequency at which the SLB host agent launches probes, and the specification of endpoints to which the probes must be targeted, may both be specified by the tenant administrator while provisioning the load balancer (VIP).

By default (before the first probe notifications arrives from the SLB host agents) probes are considered to be down, as it is undesirable for the load balancer MUX to target packets to DIPs which are not ready yet. A load balancer may first ascertain a DIP is healthy before load balancing incoming traffic onto it. The same principle may be applied to a DIP right after it has migrated, i.e., the load balancer may wait for a probe to return healthy from the migrated VM right after live migration prior to indicating that the VM is available. However this approach may provide one or more of the following issues. The probing frequency and hysteresis are specified by the tenant load balancer; hence the health of a DIP may not be determined for a period longer than the timeout window of the live migration (e.g., TCP timeout window). There could be some (one time) delays in setting up probing for the newly migrated DIP VM, such as when a DIP VM migrates to a host that does not have any other tenant VM from the same virtual subnet as the incoming VM, then some time may be needed in creating the adapter from which the SLB host agent sends its probe requests. In a distributed load balancer, there may be delays in propagating the healthy status of a DIP right after migration and it may take 100s of milliseconds to a couple of seconds to bring the migrated DIP back into the DIP set of the VIP. However, because the TCP timeout window is relatively small (typically 9 seconds) and the VM may take the same order of time in completing the live migration (black out window), this delay may be avoidable immediately after live migration.

In the systems described herein, probes are run in a distributed fashion, such that the server which hosts the tenant VM (DIP) launches probes into it. However, even if probes were launched centrally, probing would need to be made live migration aware, as a VM cannot respond to probe requests during its black out window. As a result, special handling for DIPs that have probes enabled may be needed to have the DIP flows survive live migration. Some systems that support live migration have taken steps to support live migration of tenant workloads behind an SDN load balancer. Some of these techniques include: dynamically updating switch flows when live migration is done, updating load balancer flow table caches when a live migration occurs, and updating hosts which were previously directed by the load balancer to bypass the load balancer and directly reach DIP targets. However these techniques may still not fix the problem of minimizing the down time experienced by live migration of VMs due to delays or in determining the health of the VM after the live migration. This downtime may be due to the fact that external flows directed to a DIP over a VIP prior to live migration may break or be disconnected. In some cases, these delays may be the result of the fact that new traffic over the VIP will not be directed to the DIP unless the load balancer re-determines that the DIP is healthy.

Figure 6:
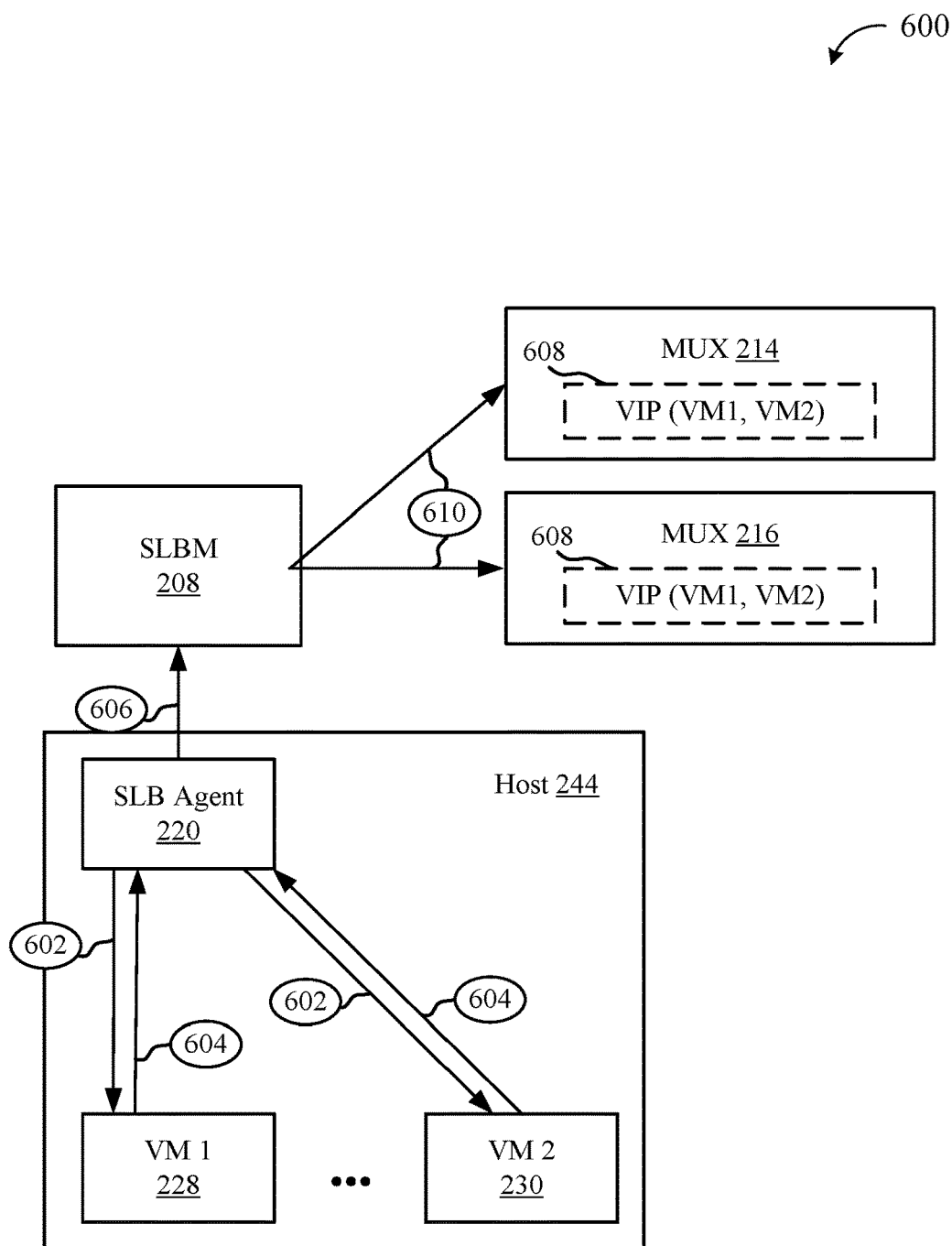
FIG. 6 depicts an example system for checking the health of one or more virtual machines by a load balancer and/or load balancer agent.

FIG. 6 illustrates an example process 600 of monitoring the health status of one or more VMs in a cloud service/datacenter, such as the system described in reference to FIG. 2. For simplicity, some components associated with the host 244 are omitted from the following discussion. It should be appreciated, however, that these components, such as a VM switch, VFP, NIC, and so on, may be implemented in process 600.

In the example illustrated, the SLB agent 220 may be primarily responsible for monitoring the health of VMs associated with a host 244, such as VMs 228, 230. This represents a distributed model for monitoring health status of VMs 228, 230. As will be described in more detail below, the techniques described herein are equally applicable to both distributed and centralized health monitoring, such that the load balancer 112, SLBM 208, and other various aspects of a load balancer may perform one or more of the same operations as the SLB agent 220 described below to a similar effect.

In one example, the SLB agent 220 may send one or more probes to each VM endpoint 228 through 230, at operation 602. Each VM 228, 230 may, in response, send a status update indicating the health of the VM 228, 230, at operation 604. The status update may take a variety of forms, and may include a simply indication of healthy or not (available or unavailable to process workloads, etc.), or more detailed information, such as an indication and/or information regarding one or more issues with the VM. The probes may be sent at 602 periodically, or upon one or more trigger conditions. In some aspects, the probe interval may be configurable or may be set (e.g., by a datacenter administrator) based on a number of factors, such as datacenter characteristics, amount of workload the datacenter is processing, host specific information, etc. In a similar way, the count of successive probes for up/down hysteresis, the type of probe (protocol), other probe related parameters may also be configurable by the tenant administrator. In some aspects, custom probes can be defined per VIP endpoint, and can be transmitted using one or more TCP/UDP or other channels.

Upon receiving the status of each VM 228, 230 at operation 604, the SLB agent 220 running on host 244 may send the status to the SLBM 208, at operation 706. Each VM 228, 230 may be associated with a datacenter identifier, such as a DIP. Each MUX 214, 216 may keep track of the available DIPS/VMs 228, 230 at any given time, to enable routing of requests, messages, information, etc., to VMs that are capable of handling the tasks associated with the requests, messages, etc. In some aspects, the availability list 608 maintained by each MUX 214 216 may be associated with one or more VIPs, to enable routing of external traffic to the datacenter. Upon receiving status updates from SLB agent 220, the SLBM 208, or other datacenter management component, may forward the updates to the MUXes 214, 216, at operation 610, to enable updating of the list of available VMs. In some instances, updates may only be sent to the SLBM 208 and/or the MUXes 214, 216 upon a change in status of one or more VMs 228, 230 (e.g., one or more of the SLBM 208 or SLB agent 220 may keep track of the status of associated VMs.)

In some aspects, probes may, by default, monitor the VMs that are up and running, i.e., operational. In some aspects, if a probe response indicates that a VM is unhealthy, existing connections to that VM may still be routed to the same VM, while new connections may be sent to other (healthy) VMs.

Figure 7:
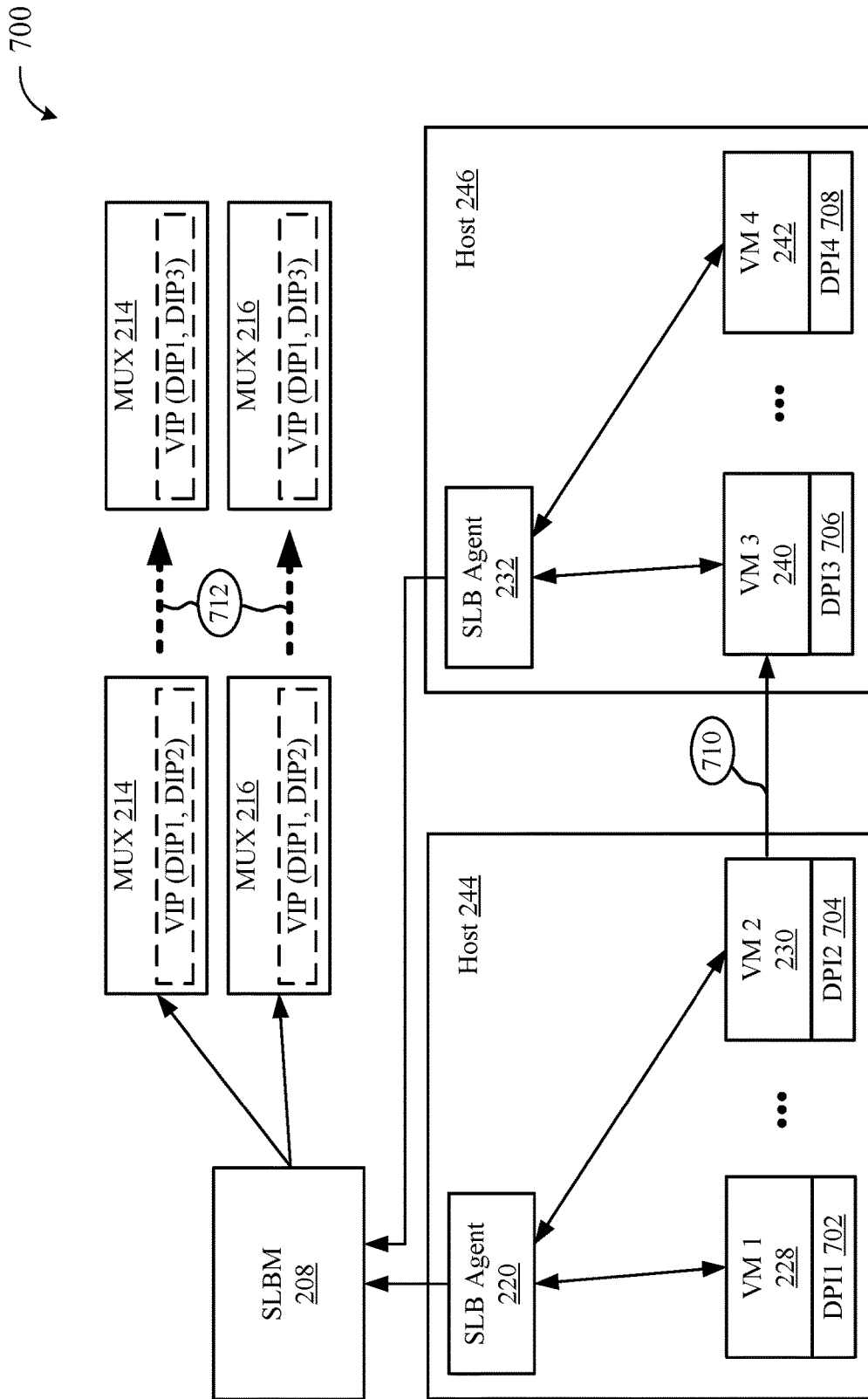
FIG. 7 depicts an example system for checking the health of one or more virtual machines concurrently with live migration of a virtual machine.

System and process 600, which depicts distributed health monitoring of VMs, may enable scaling of the probing process, such that VMs may be added or subtracted from the system, with little to adverse effect on the work load of the SLBM 208 and/or MUXes 214, 216. FIG. 7 illustrates an example process and system 700 for modifying health monitoring of a VM during a live migration of the VM. In an embodiment, SLBM 208 sends instructions to the SLB host agents 220, 232 (in an embodiment, the SLB host agents serve as probing entities) on how to set up probing for a DIP end point (e.g., 228, 230, 242). The instructions include the protocol (http/tcp/other) that the DIP endpoint (e.g., 228, 230, 242) sends probe responses on. Instructions also include the url/port number on which the probe response will be available. Instructions also include the frequency of probing and the hysteresis (e.g., successive number of failures) which the tenant administrator has configured in order to conclude a probe is up or down. The SLB host agent (e.g., 220, 230) initiates probing and sends probes at the frequency configured by the SLBM 208. After either the up or down hysteresis count is met, SLB host agent 220, 232 determines that a DIP is up or down. The determination may be continuous for the lifetime of the DIP. The SLB host agent 220, 232 communicates the determination to SLBM 208. The SLBM 208 examines the DIP state. If it is different from the previous state for a particular DIP, the SLBM causes the Mux to be programmed accordingly. For example, if a DIP was previously thought to be unhealthy by the SLBM but host agent now reports it as UP (healthy) then SLBM 208 will cause the Mux to include this DIP into the DIP set of VIPs which include it. Conversely if a DIP was previously thought to be healthy by the SLBM 208 but SLB host agent 220, 232 now reports this DIP to be down, then SLBM causes the mux to remove this DIP from the DIP sets of VIPs which include it. Since Mux owns the load balancing decision, by modulating if a DIP is part of the set to which load balancing is done—probing ensures that un healthy DIPs are not load balanced to. Operation 712, illustrates that MUX 214 keeps DIP2 active throughout the live migration of VM2. In the particular illustration, it also demonstrates and example in which VM4 changed from unhealthy to healthy state based on probing. Prior to operation 712, the VM4 was unhealthy and, accordingly, was not included in the set of DIPs for the VIP. However, after VM4 became healthy, DIP4 was added to the available list for load balancing. Notably, DIP2 remained available before and after operation 712.

For the purposes of live migration, it may be expedient to migrate probe status along with the migrating VM. Stated another way, an evaluation of probe status of a DIP VM right after live migration may not be necessary before forwarding traffic onto DIP VM, as such an evaluation may break or disrupt liveness of flows serviced or flows initiated at the migrated VM right before migration. Instead, the probe status reported by the DIP VM right before migration may be used. Therefore, probe status too may be in effect migrated with the DIP.

As described above, a DIP associated with a VM may be migrated, such that the VM before migration and after migration have the same DIP. DIPs may be statically assigned by the tenant administrator. This scenario may make it easier to support continuity of connections over live migration. For example, the IP of the migrating VM (e.g., the customer assigned IP address of the DIP) may not change as a part of the live migration process. The routing information in the underlay network (e.g., IP address of the physical host holding the VM) may change as part of the live migration process. The address assigned by the tenant administrator (the one visible inside the VM) may not change. However, it should be appreciated that the describe techniques are equally applicable to other implementations and other IP addressing schemes.

In addition, while a VM is still live migrating, it will be unable to respond to health probes during the blackout window. Any probes launched in this window will get a failure response. The load balancer may suspend evaluation of probes while the DIP VM is live migrating and instead rely on the migrated probe status. Fresh evaluation of probe status may resume after the VM has finished migrating to a target host. In some cases, to minimize chances of false negatives, evaluation of actual probe status from the VM which has finished live migrating is done after a configurable period (typically the last TCP retransmit in a datacenter is approximately 9 seconds).

For example, when the SLBM 208 detects that a load balanced VM (DIP), such as VM 2 230, associated with DIP2 704, is live migrating from host 244 to host 246, (e.g., indicated by operation 710), it also migrates the probe status of this VM 230 within the load balancer. In some aspects, if the probe status was healthy prior to live migration, then the SLBM 208 optimistically (based on the previous probe status) adds the migrated DIP to the DIP set of it's VIPs at the MUX 214, 216 right before live migration is complete. This is indicated by operation 710, which results in DIP2 704 remaining on the availability list while migrating from host 244 to host 246 along with MV2 230. This enables data flows (e.g., which may typically be on the TCP layer) to survive (with the help of a few re-transmits in the worst case) a live migration of the DIP VM.

In some cases, a VM that is unable to respond to probes during live migration may be able to deal with packets sent to it by a load balancer that optimistically assumes the VM is up during and after live migration. The reason why this works is because reliable protocols like TCP make use of re-transmissions when responses are not received for some packets. The live migrating VM will be unable to respond to TCP (or other reliable protocol) packets incident on it while it is live migrating. But the VM will be able to respond to subsequent re-transmissions of these very packets which are incident upon the VM right after the VM has live migrated. Therefore, by assuming prior probe status and switching the DIP's location in the MUX to the destination host during the live migration process, stateful flows may survive live migration. However, some packets in this flow may require retransmission.

In practice, traffic loss will only occur if probe status for a VM that was healthy prior to live migration is considered to be down right after live migration. Hence, in some cases, probe statuses for migrating VMs may only be migrated if the VM is healthy prior to live migration.

As described above, in an embodiment return traffic is routed via Direct Server Return. This means packets are not routed back to the MUX, but instead are directly routed to the edge routers for outbound flows. As a result, response from the DIP may not be monitored at the load balancer. However, in some systems, return traffic may pass through the load balancer. In these systems it is possible to monitor: whether a DIP responded to the last request that the load balancer forwarded to it, and how long the DIP took to respond, for example. In these systems, probing may be implicit, and hence passive, as opposed to the active probing strategy described above. Similar to the description above, passive probing systems may also benefit from being made live migration aware. In these cases, the time or delay to receive a DIP response may be modified to account for delays during live migration. In one example, the load balancer (or other entity) may adjust a time period by which it will wait for a DIP response before determining that the DIP is offline.

Figure 8:
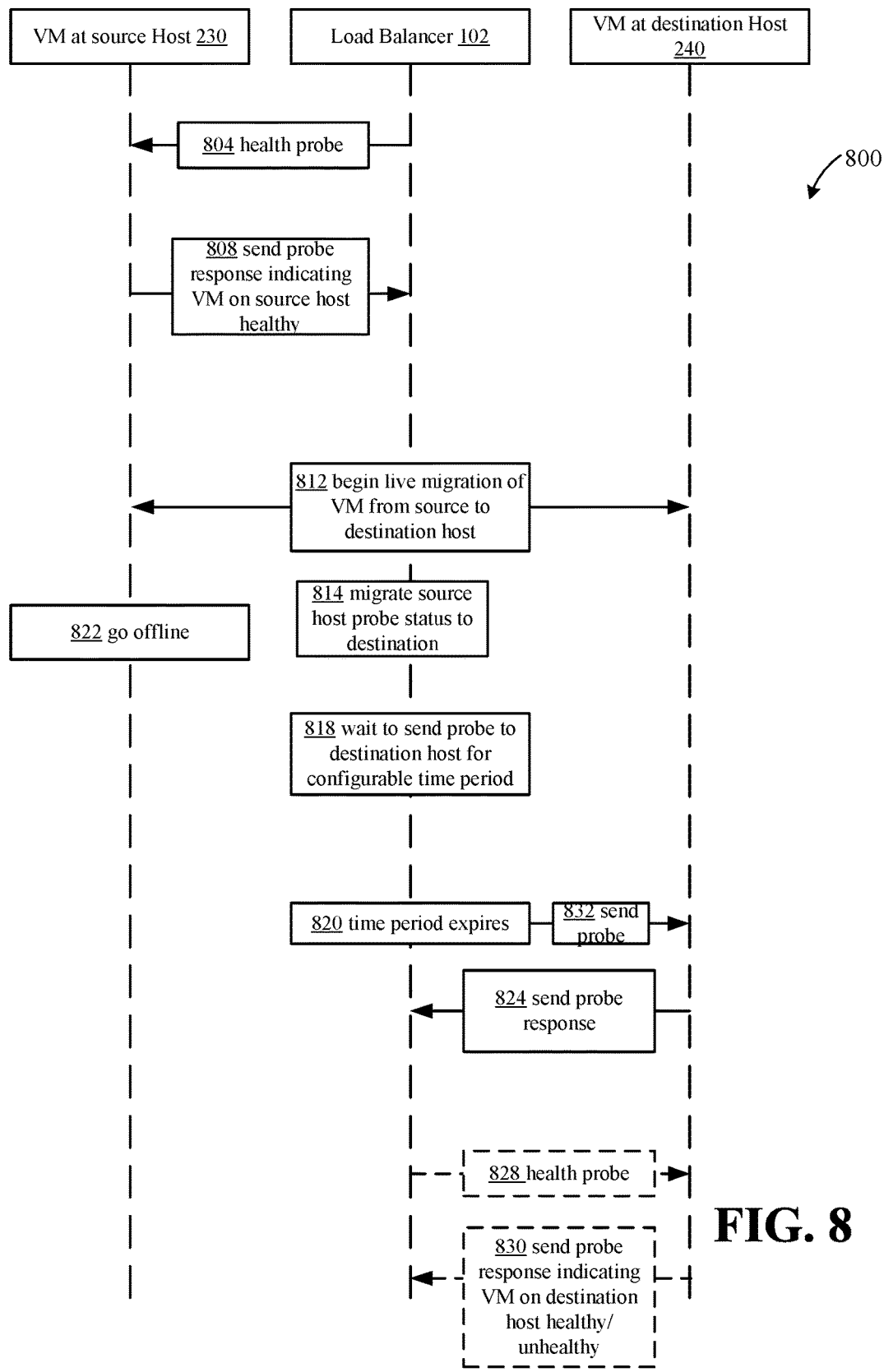
FIG. 8 depicts example communications between a virtual machine associated with a source host machine, a virtual machine associated with a destination host machine, and a load balancer for migrating probe status during live migration of a virtual machine.

FIG. 8 illustrates example communications 800 between a VM associated with source host, a load balancer, and the post migrated VM associated with a destination host for migrating health status of the VM during live migration of the VM from the source host to the destination host. As illustrated, and used in this disclosure, a dotted line may indicate that an operation or component is optional, such that the described techniques may implemented without the indicated operations or components.

In some aspects, the load balancer 102 may be a hardware load balancer, a software based load balancer, or a combination thereof. In one example, the load balancer may include a software load balancer manager, such as SLBM 208, and at least two SLB agents, such as SLB agents 220, 232, that may act as probing entities associated with the source host and the destination host respectively.

As indicated at 804, the load balancer may send a health probe from time to time to a VM on source Host 230. In the general case, the VM will respond at 808 to indicate the health state of the VM on the source host. At some point, as indicated at 812, the VM may be live migrated to the destination host 240. During the migration the VM may be offline as indicated at 822. During the migration the probe status is migrated to indicate the health status of the VM migrated to the destination as illustrated at 814. Any request for probe status, as indicated in 818 are held pending the migration. After the time period for the migration passes, the probe is sent to the VM hosted at the destination in 832. The VM responds as would normally occur at 824. Further probes and response continue with the migrated VM at 828 and 830.

Figure 9:
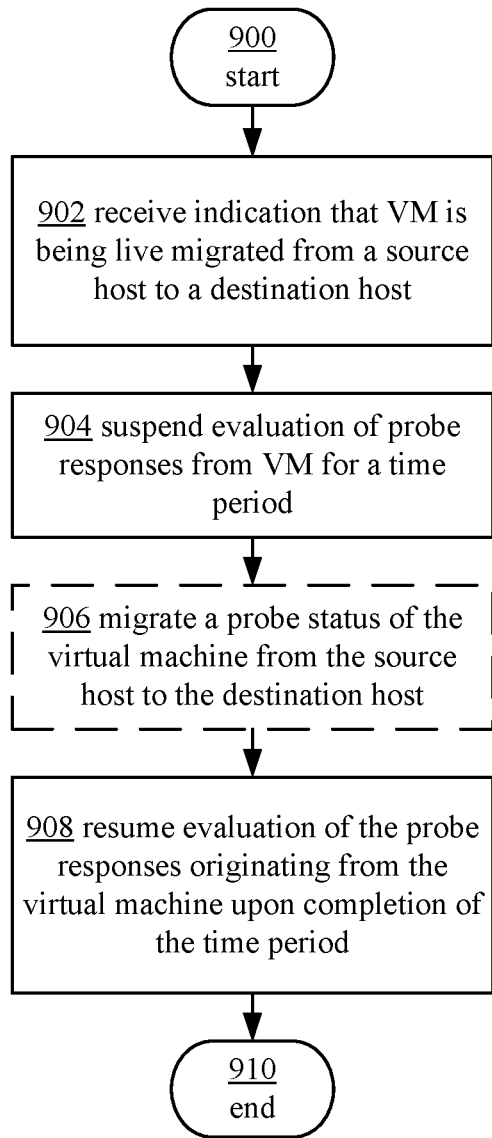
FIG. 9 depicts an example process for monitoring health status of a virtual machine during live migration of the virtual machine.

FIG. 9 illustrates an example process 900 for monitoring health status of a VM during live migration of the VM. Process 900 may be performed by a load balancer, such as load balancer 112, one or more aspects of a software load balancer (SLB), such as an SLB manager 208, SLB agents 220, 232, VM switches 226, 238 and/or VFP 224, 236, and/or MUXes 214, 216, 218, and/or VMs 228, 230, 240, 242.

As illustrated, process 900 may begin at operation 902, in which an indication that a VM is being live migrated from a source host to a destination host may be received. In some cases, operation 902 may include a load balancer or load balancer manger, such as an SLBM, receiving an indication that a host device, needs to go offline, for example, to be updated, repaired, etc. The SLBM may, in some cases, determine that a host needs to go offline, and hence that a VM needs to be live migrated. In some cases, SLBM, and/or SLB may periodically send health probes to different VMs to monitor the health of the VMs. Each VM may respond to the health probe with a probe response that indicates whether the VM is healthy or not.

Process 900 may also include operation 904, in which the evaluation of probe responses from a VM to be live migrated may be suspended for a time period. The time period may be determined or selected based on one or more characteristics of live migration, such as a typically TCP down time, or other characteristics. In some aspects, the time period may be set to be slightly longer than a TCP down time or blackout window to better ensure that upon expiration of the time period, the VM is operational.

In some examples of process 900, the probe status of the virtual machine may be migrated from the source host to the destination host, at operation 906. In some cases, this may include sending a probe status or health status from a source probing entity (e.g., an SLB agent) of the source host corresponding to the VM to the destination probing entity (e.g., an SLB agent) of the destination host for association with the migrated VM. In some aspects, operation 906 may include associating a health or probe status of a VM associated with the source host with a VM provided by the destination host.

Process 900 may further include operation 908, in which evaluation of the probe responses originating from the virtual machine may be resumed upon completion of the time period. In some aspects, operation 908 may include sending a probe to the new instance of the migrated VM on the destination host and/or receiving one or more probe responses from the migrated VM. In some cases, operation 908 may additionally or alternately include not evaluating probe responses received from the VM during live migration, regardless of whether the sending of probes to the VM during live migration is stopped. In this example, minimal changes may be made to the datacenter/load balancer to effectuate the described techniques. Upon completion of operation 908, which may correspond to the completion of the live migration of the VM, process 900 may end at 910.

Figure 10:
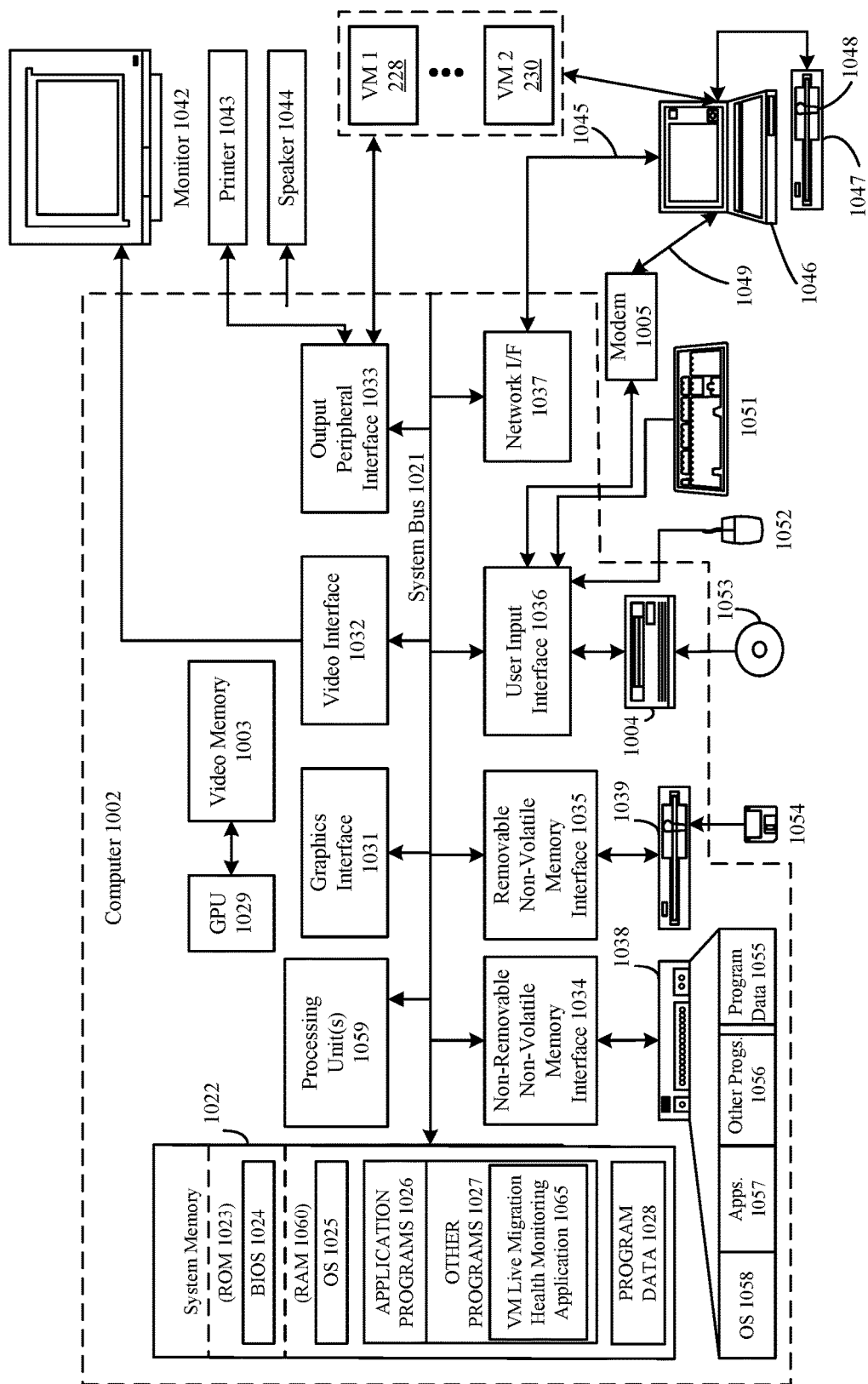
FIG. 10 depicts an example general purpose computing environment in which the techniques described herein may be embodied.

The techniques described above may be implemented on one or more computing devices or environments, as described below. FIG. 10 depicts an example general purpose computing environment, for example, that may embody one or more aspects of load balancer 112, SLBM 208, network controller 202, SLB agent 220, 232, NC agent 234, VM switch 226, 238, VFP 224, 236, MUX 214, 216, 218, or VM 228, 230, 240, 242, in which some of the techniques described herein may be embodied. The computing system environment 1002 is only one example of a suitable computing environment and is not intended to suggest any limitation as to the scope of use or functionality of the presently disclosed subject matter. Neither should the computing environment 1002 be interpreted as having any dependency or requirement relating to any one or combination of components illustrated in the example operating environment 1002. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1002, which may include any of a mobile device or smart phone, tablet, laptop, desktop computer, or collection of networked devices, cloud computing resources, etc., typically includes a variety of computer-readable media. Computer-readable media can be any available media that can be accessed by computer 1002 and includes both volatile and nonvolatile media, removable and non-removable media. The system memory 1022 includes computer-readable storage media in the form of volatile and/or nonvolatile memory such as read only memory (ROM) 1023 and random access memory (RAM) 1060. A basic input/output system 1024 (BIOS), containing the basic routines that help to transfer information between elements within computer 1002, such as during start-up, is typically stored in ROM 1023. RAM 1060 typically contains data and/or program modules that are immediately accessible to and/or presently being operated on by processing unit 1059. By way of example, and not limitation, FIG. 10 illustrates operating system 1025, application programs 1026, other program modules 1027 including a VM live migration health monitoring application 1065, and program data 1028.

The computer 1002 may also include other removable/non-removable, volatile/nonvolatile computer storage media. By way of example only, FIG. 10 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1004 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1004 are typically connected to the system bus 1021 by a removable memory interface, such as interface 1035 or 1036.

The drives and their associated computer storage media discussed above and illustrated in FIG. 10, provide storage of computer-readable instructions, data structures, program modules and other data for the computer 1002. In FIG. 10, for example, hard disk drive 1038 is illustrated as storing operating system 1058, application programs 1057, other program modules 1056, and program data 1055. Note that these components can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1002 through input devices such as a keyboard 1051 and pointing device 1052, commonly referred to as a mouse, trackball or touch pad. Other input devices (not shown) may include a microphone, joystick, game pad, satellite dish, scanner, retinal scanner, or the like. These and other input devices are often connected to the processing unit 1059 through a user input interface 1036 that is coupled to the system bus 1021, but may be connected by other interface and bus structures, such as a parallel port, game port or a universal serial bus (USB). A monitor 1042 or other type of display device is also connected to the system bus 1021 via an interface, such as a video interface 1032. In addition to the monitor, computers may also include other peripheral output devices such as speakers 1044 and printer 1043, which may be connected through an output peripheral interface 1033.

The computer 1002 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1002, although only a memory storage device 1047 has been illustrated in FIG. 10. The logical connections depicted in FIG. 10 include a local area network (LAN) 1045 and a wide area network (WAN) 1049, but may also include other networks. Such networking environments are commonplace in offices, enterprise-wide computer networks, intranets, the Internet, and cloud computing resources.

When used in a LAN networking environment, the computer 1002 is connected to the LAN 1045 through a network interface or adapter 1037. When used in a WAN networking environment, the computer 1002 typically includes a modem 1005 or other means for establishing communications over the WAN 1049, such as the Internet. The modem 1005, which may be internal or external, may be connected to the system bus 1021 via the user input interface 1036, or other appropriate mechanism. In a networked environment, program modules depicted relative to the computer 1002, or portions thereof, may be stored in the remote memory storage device. By way of example, and not limitation, FIG. 10 illustrates remote application programs 1048 as residing on memory device 1047. It will be appreciated that the network connections shown are example and other means of establishing a communications link between the computers may be used.

In some aspects, other programs 1027 may include a VM live migration health monitoring application 1065 that includes the functionality as described above. In some cases, TrEE targeting application 1065, may execute some or all operations of processes 300, 400, 500, 600, 700, 800, and/or 900. In some aspects, computing device 100 may also communicate with one or more VMs, such as VM 228, 230, etc.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

What is claimed is:

1. A data center, the data center comprising:
   a source host device and a destination host device;
   a plurality of data center internet protocol (DIP) end points, wherein each of the plurality of DIP endpoints is provided by one of the source host device or the destination host device; and
   a software load balancer communicatively coupled with the source host device and the destination host device and the plurality of DIP endpoints, wherein the software load balancer is configured to:
      determine that a DIP endpoint of the plurality of DIP endpoints is going to be live migrated from the source host device to the destination host device;
      suspend evaluation of health probe responses originating from the DIP endpoint for a time period, wherein the time period is based on the duration of the live migration;
      migrate a health probe status of the DIP endpoint from a source probing entity to a destination probing entity, wherein the health probe status indicates a health state of the DIP endpoint; and
      resume evaluation of the probe responses originating from the DIP endpoint upon completion of the time period.

2. The data center of claim 1, wherein migrating the health probe status of the DIP endpoint from the source probing entity to the destination probing entity further comprises:
   migrating the health probe status associated with the DIP endpoint associated with the source host device to a DIP endpoint associated with the destination host device.

3. The data center of claim 2, wherein each instance of the plurality of DIP endpoints maps to a DIP address, and wherein a DIP address associated with a live migrating DIP endpoint is indicated as available during the live migration.

4. The data center of claim 3, wherein the data center further comprises:
   at least one multiplexer communicatively coupled to the software load balancer, wherein the at least one multiplexer maintains a list of available DIP addresses corresponding to one or more virtualized IP addresses addressable outside of the datacenter.

5. The data center of claim 1, wherein the software load balancer comprises a software load balancer manager, a source host software load balancer agent associated with the source host device, and a destination host software load balancer agent associated with the destination host device, wherein the software load balancer manager is configured to:
   determine that the DIP endpoint of the plurality of DIP endpoints is going to be live migrated from the source host device to the destination host device; and
   migrate the health probe status of the DIP endpoint from the source host agent to the destination host agent;
   wherein the source host software load balancer agent is configured to suspend evaluation of the health probe responses originating from the DIP endpoint for the time period; and
   wherein the destination host software load balancer agent is configured to resume evaluation of the health probe responses originating from the DIP endpoint upon completion of the time period.

6. A method for facilitating live migration a Data Center IP (DIP) end point from a source host to a destination host, the method comprising:
   receiving an indication that the DIP endpoint is going to be live migrated from a source host to a destination host;
   suspending evaluation of health probe responses originating from the DIP endpoint for a time period, wherein the time period is based on the duration of the live migration; and
   resuming evaluation of the health probe responses originating from the DIP endpoint upon completion of the time period.

7. The method of claim 6, further comprising:
   migrating a health probe status of the DIP endpoint from a source probing entity to a destination probing entity, wherein the health probe status indicates a health state of the DIP endpoint.

8. The method of claim 7, further comprising:
   sending a health probe to the DIP endpoint by a load balancer prior to the live migration;
   receiving a health probe response from the DIP endpoint prior to the live migration; and
   wherein the health probe status is based on the first probe response.

9. The method of claim 6, wherein the DIP endpoint is hosted in a virtual machine or a container.

10. The method of claim 7, wherein migrating the probe status of the DIP endpoint from the source probing entity to the destination probing entity is performed when the probe status indicates the DIP endpoint is healthy.

11. The method of claim 6, wherein the DIP endpoint is indicated as available during the live migration.

12. The method of claim 11, wherein the DIP endpoint is associated with one or more DIP addresses, and wherein the one or more DIP addresses are associated with one or more virtualized internet protocol addresses when the DIP endpoint is healthy.

13. The method of claim 6, wherein the time period is selected based on a TCP timeout window for the live migration.

14. The method of claim 6, wherein the method is performed by at least one of a software load balancer, an agent software load balancer associated with the source host, an agent software load balancer associated with the destination host, a virtual machine switch, or a hardware load balancer.

15. A non-transitory computer-readable storage medium having stored thereon instructions that, upon execution by at least one processor, cause the at least one processor to perform operations for facilitating live migration a Data Center IP (DIP) end point from a source host to a destination host, the operations comprising:
   receiving an indication that a DIP endpoint is going to be live migrated from a source host to a destination host;

suspending evaluation of health probe responses originating from the DIP endpoint for a time period, wherein the time period is based on the time period of the live migration; and resuming evaluation of the probe responses originating from the DIP endpoint upon completion of the time period.

16. The computer-readable storage medium of claim 15, wherein the instructions, upon execution by the at least one processor, cause the at least one processor to perform additional operations of:

migrating a health probe status of the DIP endpoint from a source probing entity to a destination probing entity, wherein the health probe status indicates whether the DIP endpoint is healthy or unhealthy.

17. The computer-readable storage medium of claim 16, wherein the instructions, upon execution by the at least one processor, cause the at least one processor to perform additional operations of:

sending a health probe to the DIP endpoint by a load balancer;

receiving a health probe response from the DIP endpoint; and wherein the health probe status is based on the health probe response.

18. The computer-readable storage medium of claim 16, wherein migrating the probe status of the DIP endpoint from the source probing entity to the destination probing entity is only performed when the probe status indicates the DIP endpoint is healthy.

19. The computer-readable storage medium of claim 15, wherein the time period is based on a TCP timeout window for the live migration.

20. The computer-readable storage medium of claim 15, wherein the DIP endpoint is hosted in a virtual machine or a container.

* * * * *